United States Patent [19]

Nerland et al.

[11] Patent Number: 5,056,969
[45] Date of Patent: Oct. 15, 1991

[54] MAGNETICALLY ATTACHABLE SHIELD FOR MACHINE TOOLS

[76] Inventors: Norman Nerland, 1134 Argyle Street, Regina, Saskatchewan, Canada, S4T 3R5; Dale Stephenson, 316 McDonald Street, Regina, Saskatchewan, Canada, S4N 6P6

[21] Appl. No.: 569,655

[22] Filed: Aug. 20, 1990

[51] Int. Cl.⁵ .......................... B23C 9/00; B23Q 11/06
[52] U.S. Cl. ............................. 409/134; 29/DIG. 94; 51/272; 408/241 G
[58] Field of Search ...................... 408/241 G, 710, 67; 409/134; 29/DIG. 94; D15/138; 74/609, 608; 82/152; 83/860; 51/272, 274, 268

[56] References Cited
U.S. PATENT DOCUMENTS

| | | | |
|---|---|---|---|
| 1,217,838 | 2/1917 | Schmidt | 82/152 |
| 2,604,823 | 7/1952 | Szypulinski | 409/134 |
| 2,825,268 | 3/1958 | Mambro et al. | 409/134 |
| 3,703,124 | 11/1972 | Smith et al. | 51/272 |
| 4,884,927 | 12/1989 | Menker | 408/241 G |

Primary Examiner—William Briggs
Attorney, Agent, or Firm—Adrian D. Battison; Stanley G. Ade; Murray E. Thrift

[57] ABSTRACT

A shield device for attachment to a machine tool is disclosed. Provision for a slotted member that receives a sheet of shield material is made. Bracket arm means mount the shield for adjustable pivotable movement, and clamping means or magnetic means allow attachment of the shield device to a machine tool.

2 Claims, 2 Drawing Sheets

5,056,969

MAGNETICALLY ATTACHABLE SHIELD FOR MACHINE TOOLS

BACKGROUND OF THE INVENTION

This invention relates to the field of devices for shielding or protecting one's face or eyes while using machine tools.

Clear protection shields for machine tools have been used for quite some time. The prior art shows compact, portable shields that easily attach to machinery and provide a degree of head, and more specifically, eye protection.

A review of prior art devices shows two types of attachable shield devices for machine tools.

U.S. Pat. No. 1,217,838 demonstrates an eye shield for machine tools, attachable to the machine by clamp.

U.S. Pat. No. 2,604,823 demonstrates a machine guard that attaches to a machine tool by bolting the device thereon. There is also disclosed an adjustable shield.

SUMMARY OF THE INVENTION

It is one object of the invention to provide an improved shield which is readily attachable and removable from various different styles and arrangements of machine tool. According to the invention there is provided a machine tool shield device comprising a shield, a bracket for attachment of the shield to a machine tool, a bracket including magnetic means of attachment of the bracket to a machine tool and means of adjustment of the shield relative to the bracket.

The device described herein takes the prior art further in that it is easily moved from machine to machine and is attached firmly by magnet to the tool of the user's choice. The device is simple, compact, portable and easy to adjust. There are no bolts or screws necessary to attach the device to a machine.

The embodiment of the invention described herein also provides for attachment if necessary by clamp to a machine tool where an additional degree of attachment is required. This device also allows for the insertion of a second shield which could provide added protection to the user. The second shield may also be tinted to allow for the easier observation of work that generates light from sparks or extreme heating of metal. The tinted glass may also be used to cut down on glare from very shiny metal or other high gloss material being worked upon.

This device allows for the rotation of the shield on a bracket attached to the magnet portion of the device. This, along with other features above described allows for the adjustment of the shield to adapt to the machine being used and the function being performed. This device has been tried and used successfully on drill presses, lathes, grinders, band saws, brick cutters, power saws and buffers.

The device is ideal for a one or two person workshop in that a shield would not be necessary for each machine, as one could be easily moved by the workman as required.

The shield may also be used, along with the appropriate clip, as a drawing or plan holder while working on a machine and doing a job that requires reference to plans or drawings.

With the foregoing in view, and other advantages as will become apparent to those skilled in the art to which this invention relates as this specification proceeds, the invention is herein described by reference to the accompanying drawings forming a part hereof, Which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
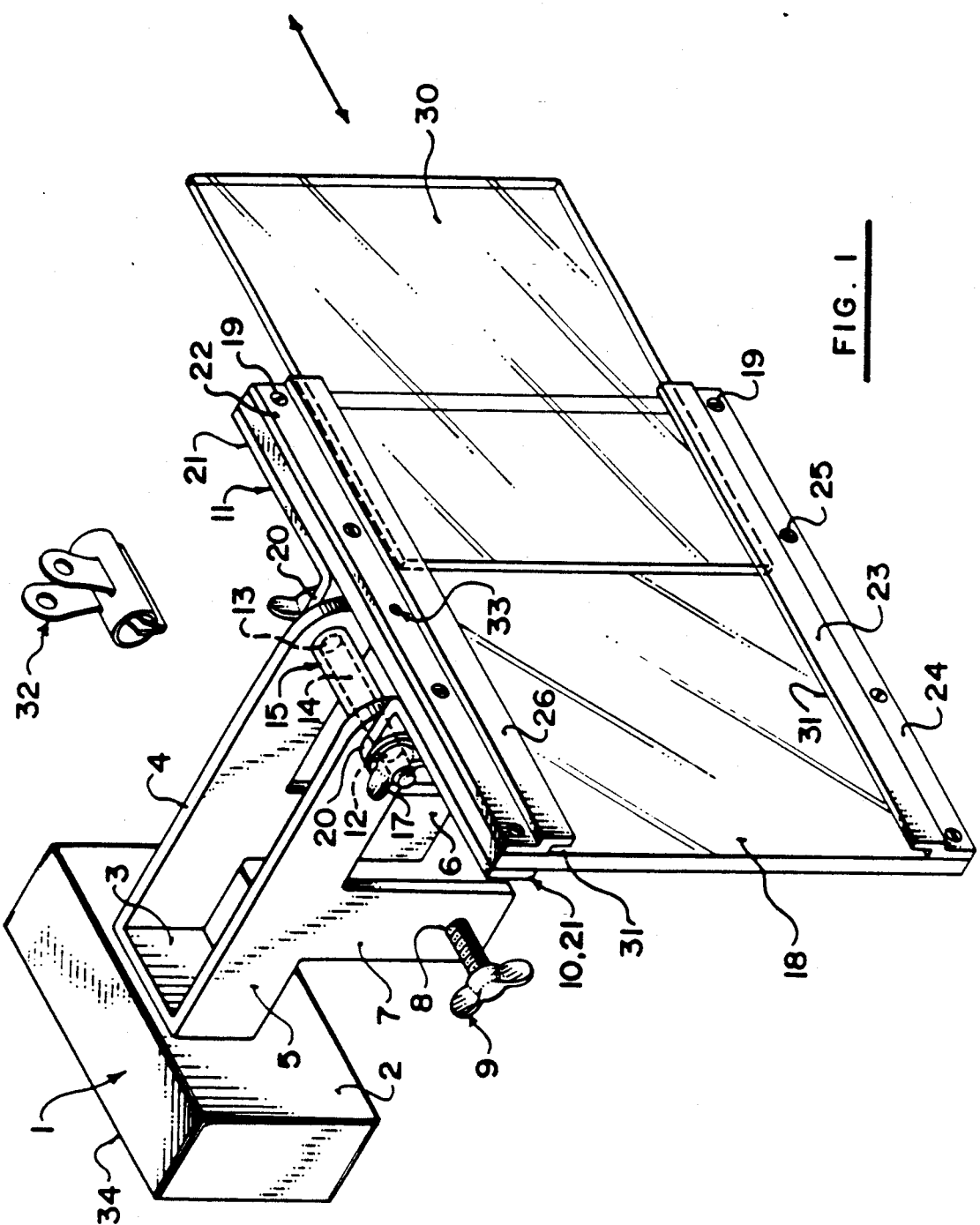
FIG. 1 is an isometric view of the preferred embodiment attached to a machine tool part by clamping action.
Figure 2:
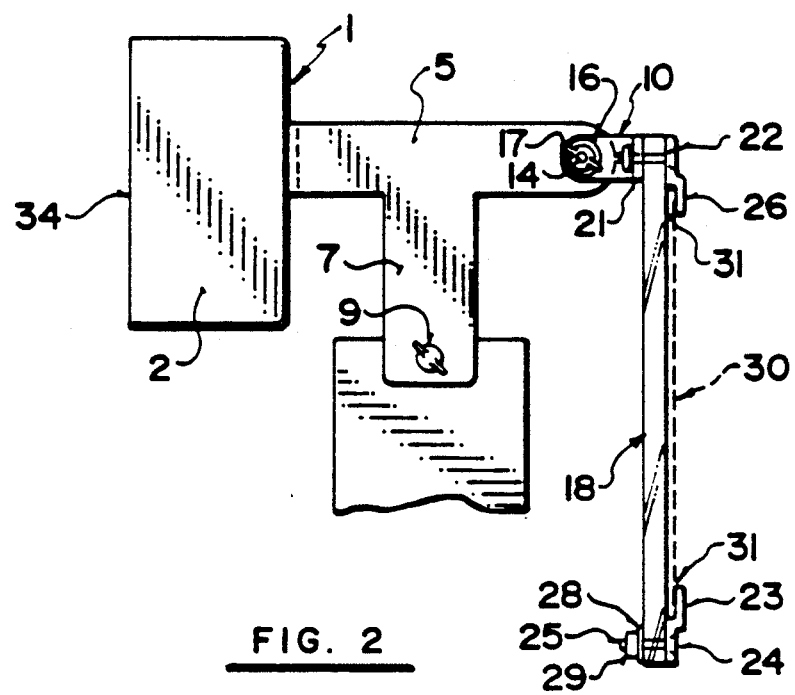
FIG. 2 is a side elevational view of the preferred embodiment attached to a machine tool part by magnetic action.
Figure 3:
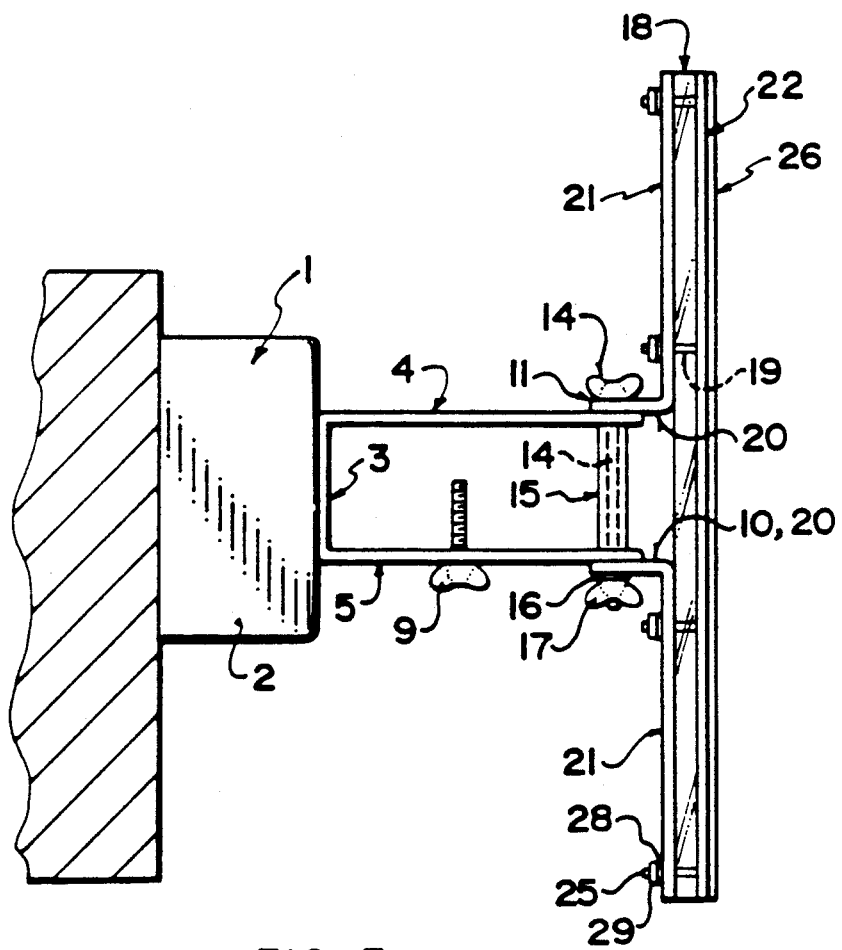
FIG. 3 is cross-sectional view of the preferred embodiment.

A magnet 1 is attached to a cup 2. The cup 2 is integrally associated with a U-shaped member 3 with arms 4 and 5 extending outward from the magnet cup 2 and forming the two arms of the U-shape. Each of the U-shaped arms 4 and 5 have a perpendicular arm 6 and 7. There is located on arm 6 an opening 8, that allows bolt 9 to pass through the opening 8 and into the space between perpendicular arm 6 and 7.

There is attached to arms 4 and 5, angle brackets 10 and 11. Angle brackets 10 and 11 form a 90 degree angle and are comprised of two portions one portion 20 being shorter in length than the longer portion 21. The shorter portion 20 of the angle bracket 10 and 11 attach to the outside of the U-shaped arms 4 and 5 and extend parallel with arms 4 and 5. Angle arms 10 and 11 are attached to arms 4 and 5 by a bolt 14 through openings 12 and 13 on the smaller portion of 20 with angle brackets 10 and 11. The bolt 14 is covered by spacer 15 which positions the U-shaped arms 4 and 5. Washers 16 and wing bolt 17 are positioned on the bolt 14 on the outside of the angle bracket 10 and 11. The longer portion 21 of angle brackets 10 and 11 extend 90 degrees outwardly from arms 4 and 5. Angle brackets arms 10 and 11 have a plurality of openings 19 to allow for the attachment of shield 18. The shield 18 is attached by a bolt 25 at a plurality of openings 19 said opening aligning with the openings on the bracket arms 10 and 11.

Attached to shield 18 are slides 21 and 23 which also have openings 19 for bolts 25. Attached to slides 26 and 23 are strips 22 and 24 respectively with openings 19 aligned to allow for passage of bolt 25 therethrough. When bolts 25 have been positioned through opening 19, through arm 20, shield 18, slide 26 and strip 22, they are held in place by washers 28 and nuts 29. At the bottom of shield 18, bolt 25 passes through opening 19 on shield 18, slide 23, and strip 24. Bolts 25 are held in place by washers 28 and nuts 29.

An attached spring loaded clip 32 is attached to the shield 18 at point 33.

A magnet 1 attaches to a machine tool at 34, thereby holding the device on a machine. Adjustment of the shield 18 portion of the device is accomplished by loosening or tightening wingnuts 17 and the movement of the angle bracket arm about an axis at bolt 14.

The slide pieces 26 and 23, when attached to the shield by strips 22 and 24, and bolts 25 washers 28 and nuts 29 provide a channel 31, which allows for the insertion of additional shield 30, if desired. The arms, 6 and 7, extending perpendicular from the U-shaped member arms 4 and 5, function as a clamp, in conjunction with bolt 9 passing through arm 6 at opening 8. The additional shield of the embodiment described is tinted and may be used when operating a machine that produces sparks, or used to give the operator a better view of a shiny metal or other high gloss material.

The positioning of the device on the machine, and the adjustment of the device about bolt 14, is determined by the operator of the machine. The device is easily detached and moved to another machine due to the magnetic feature of the device. The arms 6 and 7 may be fitted on a portion of the machinery that allows for the bolt 9 to act as a clamp. The bolt 9 is tightened, abuting the machine and thereby holding the device on the machine, with or without the use of the magnet 1. The clip 32 is spring loaded and allows the operator to place plans or drawings between the clip 32 and shield 18 thereby holding the papers in place. The device is attached by magnet or clamp as described above. This allows the operator to refer to drawings of plans while concentrating his hands on his work. This allows for an easy unobstructed view of his plans or drawing, as well as his hands.

Since various modifications can be made in my invention as hereinabove described, and many apparently widely different embodiments of the same made within the spirit and scope of the claims without departing from such spirit and scope, it is intended that all matter contained in the accompanying specification shall be interpreted as illustrative only and not in a limiting sense.

I claim:

1. A shield device for attachment to a machine tool comprising a substantially planar shield member, means defining a pair of opposed slots on the shield member into which a sheet of shield material can be inserted so as to be held thereby, a slip mounted on the shield member for releasably grasping a sheet of paper and for holding the sheet of paper flat against a face surface of the shield member, the shield member having bracket arm means mounted thereon and projecting rearwardly therefrom at a position adjacent an edge thereof, and a bracket for attachment of the shield member to a machine tool comprising a base member having a front surface and a rear surface magnet means on the rear surface of the base member for attachment of the bracket to a steel element of the machine tool, a U-shaped support having a planar base and two parallel planar arms extending forwardly from the base with the base attached to the front surface of the base member, each of the parallel arms having an end thereof remote from the base attached to said bracket arm means so as to allow pivotal movement of said shield member and said bracket arm means relative to said parallel arms about an axis parallel to said base and passing through each of said parallel arms.

2. A shield device for attachment to a machine tool comprising a substantially planar shield member, means defining a pair of opposed slots on the shield member into which a sheet of shield material can be inserted so as to be held thereby, a clip mounted on the shield member for releasably grasping a sheet of paper and for holding the sheet of paper flat against a face surface of the shield member, the shield member having bracket arm means mounted thereon and projecting rearwardly therefrom at a position adjacent an edge thereof, and bracket for attachment of the shield member to a machine tool comprising a base member having a front surface and a rear surface magnet means on the rear surface of the base member for attachment of the bracket to a steel element of the machine tool, a U-shaped support having a planar base and two parallel planar arms extending forwardly from the base with the base attached to the front surface of the base member, each of the parallel arms having an end thereof remote from the base attached to said bracket arm means so as to allow pivotal movement of said shield member and said bracket arm means relative to said parallel arms about an axis parallel to said base and passing through each of said parallel arms, each of said parallel arms having a clamp portion thereof coplanar therewith extending outwardly therefrom to one side such that the clamp portions are aligned and screw clamp means extending through one of said clamp portions for clamping an element of the machine tool between said clamping means and the other of the clamp portions.

* * * * *